US010553022B2

(12) United States Patent
Massaro (10) Patent No.: US 10,553,022 B2
(45) Date of Patent: Feb. 4, 2020

(54) METHOD OF PROCESSING FULL MOTION VIDEO DATA FOR PHOTOGRAMMETRIC RECONSTRUCTION

(71) Applicant: United States of America—US Army, Alexandria, VA (US)

(72) Inventor: Richard D Massaro, Burke, VA (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 15/720,133

(22) Filed: Sep. 29, 2017

(65) Prior Publication Data
US 2019/0347852 A1 Nov. 14, 2019

(51) Int. Cl.
*G06T 17/10* (2006.01)
*G06T 17/05* (2011.01)
*G06F 16/75* (2019.01)
*G06F 16/735* (2019.01)
*G06F 16/78* (2019.01)

(52) U.S. Cl.
CPC ............ *G06T 17/10* (2013.01); *G06F 16/735* (2019.01); *G06F 16/75* (2019.01); *G06F 16/78* (2019.01); *G06T 17/05* (2013.01)

(58) Field of Classification Search
CPC ......... G06T 17/10; G06T 17/05; G06F 16/78; G06F 16/735; G06F 16/75
See application file for complete search history.

(56) References Cited

U.S. PATENT DOCUMENTS 6,597,818 B2 * 7/2003 Kumar ................. G06T 3/0081
                                                    382/284
9,607,219 B2 * 3/2017 Greveson ........... G06K 9/00476

* cited by examiner

*Primary Examiner* — Phuoc Tran
(74) *Attorney, Agent, or Firm* — Brian C. Jones (57) ABSTRACT

This invention is a system for photogrammetric analysis of full motion video (FMV), which converts FMV to image files, extracts metadata, and produces accurate 2-D and 3-D geospatial images in real time.

20 Claims, 11 Drawing Sheets

Fig. 4A $$f \approx 1.058 \times \left( \frac{1}{\tan\left(FOV_H/2\right)} + \frac{1}{\tan\left(FOV_V/2\right)} \right)$$

Fig. 4B

Fig. 5A $$\omega \approx \tan^{-1}\left(\frac{\Delta y}{\Delta x}\right) - \frac{\pi}{2}$$

Fig. 5B $$\phi \approx \tan^{-1}\left(\frac{\sqrt{R_c^2 - h^2}}{h}\right)$$

Fig. 5C $$d_{i,j} = \sqrt{(y_j - y_i)^2 + (x_j - x_i)^2}$$

METHOD OF PROCESSING FULL MOTION VIDEO DATA FOR PHOTOGRAMMETRIC RECONSTRUCTION

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties.

FIELD OF INVENTION

The invention relates to the field of photogrammetric image analysis, and more specifically to a system for rapidly processing full motion video in real-time.

BACKGROUND OF THE INVENTION

Photogrammetry is the science of making measurements from photographs and for recovering the exact positions of surface points Photogrammetric computational methods draw upon optics, mathematics and projective geometry.

The U.S. Army Corps of Engineers (USACE) is conducting advanced research to meet the challenge of using photogrammetric techniques to transform millions of terabytes of Full Motion Video (FMV) data from unmanned vehicles, wireless cameras and other sensors into usable 2-D and 3-D maps and models To apply photogrammetric computational models, FMV data gathered from airplanes, satellites, and other sources must be parsed into still frame images. The still frame images contain coordinates and meta data which are extracted for processing by computational model. The exterior orientation of the camera or sensor defines its location in space and its view direction. The inner orientation defines the geometric parameters of the imaging process. The focal length of the imaging lens is a component of these geometric parameters.

By feeding the measurements from each individually processed image frame into a computational model, it is possible to rapidly and accurately estimate 3-D relative motions and other measurements for each frame. It currently is not possible toto produce accurate 3-D models in real time, on a consistent basis, because of limitations inherent in the frame selection process. Frame selection is costly and time-consuming process that is currently performed by manually by human technicians.

The current state of art requires human intervention to filter relevant the frames which contain target objects from frames are irrelevant and should be excluded from computational analysis There is an unmet need for intelligent, automated technologies which can rapidly select relevant image frames for processing from vast amounts of video data.

There is an unmet need for automated technologies which can detect and filter frames which are distorted or otherwise of insufficient quality for accurate processing.

There is a further unmet need for a fully automated method for processing FMV data that can address anomalies in acquired data and filter image frames which are unsuitable for processing in real-time.

SUMMARY OF THE INVENTION

This invention is an intelligent system for rapidly processing full motion video (FMV) through interpolation processes to rapidly replicate missing or corrupted data and algorithmic selection of relevant image frames. This system includes processing components and memory storage for metadata and image files.

The system includes multiple virtual processing components which perform data parsing processes, metadata extraction processes, data interpolation processes and filtering processes using data collected from other virtual processing components.

Novel processing components iteratively perform geometric calculations of angle measurements and focal lengths on extracted metadata associated with image files. Virtual processing components perform rapid filtering processes. Other virtual processing components perform novel threshold computation and cluster analysis, including cluster indexing. This method and system allow the rapid production of highly-accurate 2-D and 3-D images in real time. The increased processing speed of the system is achieved by configuration of system components to perform novel geometric calculations rather than by increased processing capability.

TERMS OF ART

As used herein, the term "angle" means an angles of a sensor relative to a real-world coordinate plane.

As used herein, the term "cluster" means a collection of filtered image files as As used herein, the term "cluster count threshold" means the minimum number of image files which must be associated with a cluster.

As used herein, the term "color threshold value" means a minimum red green blue (RGB) value that an image file must have to be included in a cluster.

As used herein, the term "Field of View" (FOV) means the area recorded by the sensor in each video frame.

As used herein, the term "focal length" means a value used to determine image size or scale.

As used herein, the term "Full Motion Video" (FMV) means video taken from a camera or other sensor including and motion imagery at a minimum speed of approximately 25 frames per second with metadata, consistent with Department of Defense Motion Imagery Standards Board (MISS) format.

As used herein, the term "image file" means a video frame that is stored in an image file format as pixels having a red green blue (RGB) color value.

As used herein, the term "Key-Length-Value" (KLV) is a format for encoding data.

As used herein, the term "metadata values" means measurements including field of view dimensions, and latitude, longitude, and altitude position coordinates of the sensor that collects the FMV data.

As used herein, the term "National Imagery Transmission Format" (NITF) means a U.S. Department of Defense (DoD) and Federal Intelligence Community (IC) suite of standards for the exchange, storage, and transmission of digital-imagery products and image-related products.

As used herein, the term "object" means a processing component that contains both data and data structures and code which performs operations on the data structures.

As used herein, the term "position coordinates" means geographic location with variables selected from a group consisting of latitude, longitude, and altitude.

As used herein, the term "processor" means hardware or software having processing capability which may be bound to non-modifiable values and functions.

As used herein, the term "proximity threshold" means a maximum distance between image file position coordinates that determines which video frames will be included in a cluster.

As used herein, the term "virtual processing component" refers to software which performs a computational process and functions identically to the circuitry of a physical processor.

DETAILED DESCRIPTION OF THE INVENTION

Figure 1:
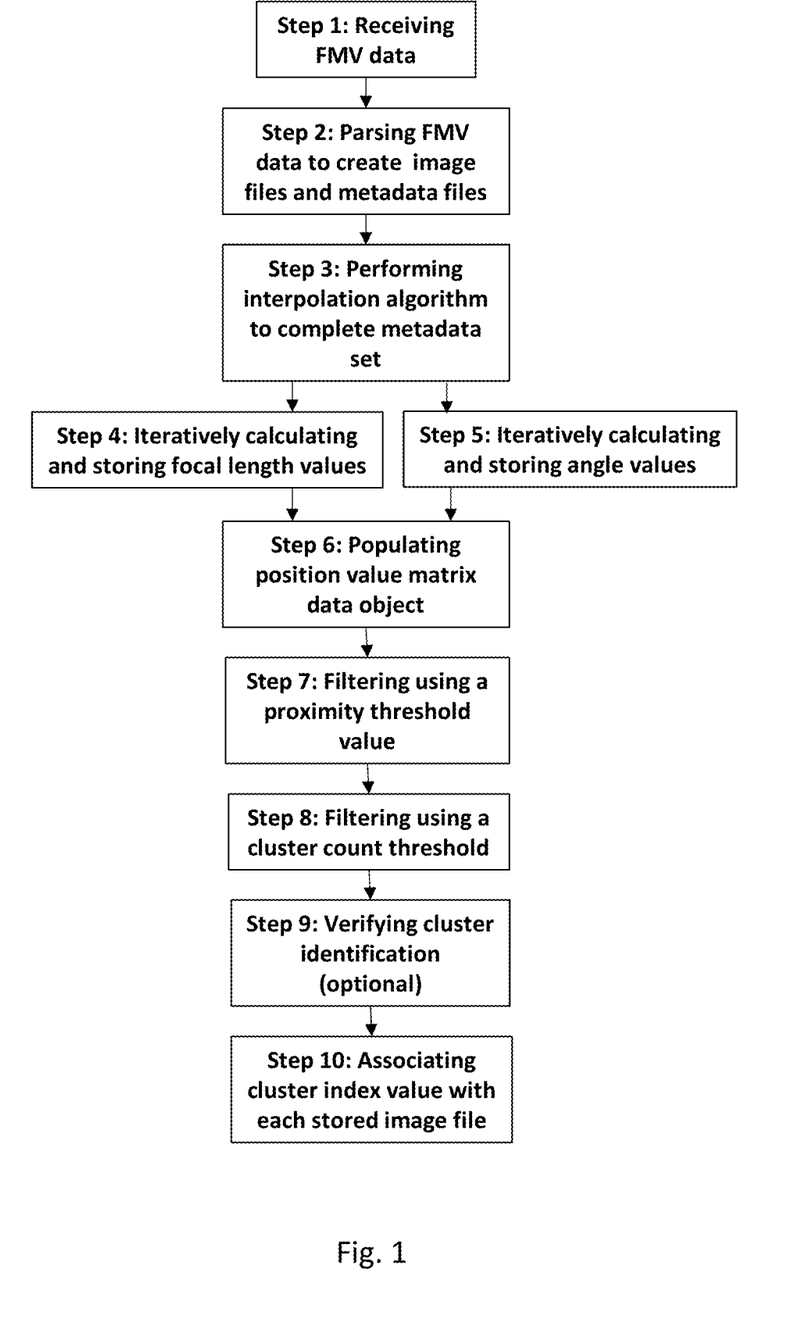
FIG. 1 illustrates an exemplary computer-implemented method for processing FMV data for automated photogrammetric reconstruction.

FIG. 1 illustrates an exemplary computer-implemented method for processing FMV data for automated photogrammetric reconstruction 100.

In various embodiments, Method 100 can be used to produce two- or three-dimensional geographic data that correspond with the subject of the FMV or the location of the sensor that collects the FMV data. Method 100 automatically processes FMV data for delivering rapid two-dimensional (2-D) and three-dimensional (3-D) geospatial outputs.

In various embodiments, the data source may be a data file or streaming data source. The streaming data source may be continuous or non-continuous. The FMV can be streaming and does not have to be continuous.

Method 100 calculates the focal length (f) and photogrammetric angles for each video frame. These parameters are needed for automated photogrammetric reconstruction and includes a novel clustering algorithm to process a filtered subset of FMV frames based on the geometry of the sensor trajectory.

In various embodiments, user input may include FMV file or stream, estimated elevation of the FMV subject if the frame center elevation is not present within the location metadata, and a desired the number of frames required to define a cluster (cluster count threshold).

Method 100 calculates necessary angles and focal length required for automated photogrammetric reconstruction from FMV sources. The clustering algorithm is performed using the data from the angle calculation and focal length calculation. Method 100 further may be automated using various programming scripts and tools such as a novel Python script generator.

Step 1 is the step of receiving. FMV data, including video files and metadata files. The system can receive either a file or a stream and will process either data set. Data may be received in a continuous or non-continuous manner. The system can process discontinuous data which accommodates various points of view (e.g., repositioning of the sensor).

Step 2 is the step of parsing FMV data to create image files and metadata files associate with each image file. Image files and metadata files are iteratively processed, stored and indexed as data is extracted. In this step, sensor position coordinates and field of view (FOV) dimensions are extracted from metadata sets associate with each image file.

Each image file includes, but, is not limited to: a still image copied corresponding to a video frame from an FMV, having pixels and color (red green blue, or RGB values), The metadata set includes, but is not limited to the following variables: latitude, longitude, and altitude of the sensor and vertical FOV dimension $FOV_V$ and horizontal FOV dimension $FOV_H$.

In various embodiments, metadata is encoded into U.S. Department of Defense (DoD) FMV data using the Motion Imagery Standards Board (MISB) Key-Length-Value (KLV) format.

Step 3 is the step of performing an interpolation algorithm to complete the metadata set.

This step averages multiple sensor position coordinates over time and uses the average to populate missing metadata values.

Step 4 is the step of iteratively calculating and storing the focal length value for each image file from FOV dimensions.

This step uses the following variables: vertical FOV dimension $FOV_V$ and horizontal FOV dimension $FOV_H$. Focal length (f) is calculated by the following formula, which assumes that the sensor has a ⅓" format.

$$f \approx 1.058 \cdot \left( \frac{1}{\tan\left(\frac{FOV_H}{2}\right)} + \frac{1}{\tan\left(\frac{FOV_V}{2}\right)} \right)$$

Step 5 is the step of calculating and storing photogrammetric relevant angle values. In this step, the system calculates yaw ($\omega$) and pitch ($\varphi$) angles for each image file from sensor position coordinates.

This step uses the following variables to calculate yaw angle ($\omega$): the vertical change in position of the sensor ($\Delta y$), and the horizontal change in position of the sensor ($\alpha x$). The yaw angle ($\omega$) formula is;

$$\omega \approx \tan^{-1}\left(\frac{\Delta y}{\Delta x}\right) - \frac{\pi}{2}$$

This step uses the following variables to calculate pitch angle (φ): distance between sensor and field of view ($R_c$) and altitude of sensor (h), The pitch angle (φ) formula is:

$$\varphi \approx \tan^{-1}\left(\frac{\sqrt{R_c^2 - h^2}}{h}\right)$$

Step 6 is the step of populating a position value matrix data object with position coordinates (longitude, latitude, and altitude) of the field of view (FOV) in each image file.

The position value matrix data object includes both data structures and virtual processing capability which calculates the distance (d) between longitude and latitude position values (x, and y) for each pair of image files. The following formula calculates distance (d) based on position values x and y:

$$d_{i,j} = \sqrt{(y_j - y_i)^2 + (x_j - x_i)^2}$$

Step 7 is the step of filtering using a proximity threshold value.

This proximity threshold value is calculated as a percentage of the horizontal field of view dimension ($FOV_H$) and vertical field of view dimension ($FOV_V$).

This step performs a filtering process by comparing distance (d) to the proximity threshold value. Only image files which have a distance smaller than the proximity threshold value are filtered and stored for further processing. In this step, a counter is incremented to track the number of stored files which meet the proximity value threshold to obtain a count of stored image files.

Step 8 is the step of filtering using a cluster count threshold. The cluster count threshold is a user defined value that determines the minimum number of frames which must be stored during the previous step to determine if a cluster exists. This frame count in the previous step is compared to the cluster count threshold.

Step 9 is the optional step of verifying cluster identification. In this step, image files which surround identified clusters are sampled to include all image files relevant to the cluster. This step samples image files having position coordinates (x, y) external to the cluster perimeter. The sampling pattern is based on calculated yaw angle (ω).

Step 10 is the step of iteratively associating a cluster index value with each stored image.

In various embodiments, Method 100 creates a folder for each cluster and stores cluster-associated image files in the corresponding cluster folder.

In various embodiments, Method 100 produces 2-D and 3-D geospatial products from FMV data.

Figure 2:
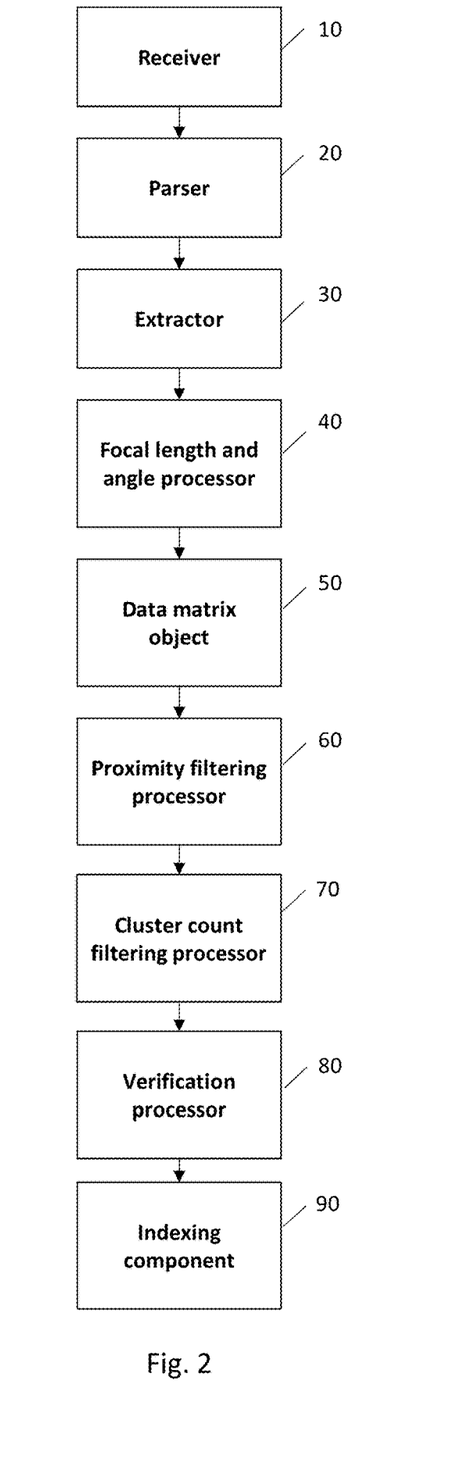
FIG. 2 illustrates an exemplary embodiment of a real-time filtering system for rapid processing of FMV still image frames.

FIG. 2 illustrates an exemplary embodiment of a computer system having hardware and software components and used for rapid processing of FMV still image frames 200. System 200 is a computer having a processor and memory. In the exemplary embodiment shown, the user input of FMV file or stream is required. In various embodiments, system 200 also requires user input of the estimated scene elevation if the frame center elevation is not present within the metadata values.

In various embodiments, system 200 automatically processes and delivers rapid 2-D and 3-D geospatial products derived from, currently fielded FMV platforms across the DoD.

In still other embodiments, system 200 may be used to process FMV data to create 2-D and 3-D geospatial data from U.S. DoD (MISS-compliant) and international defense organizations' airborne FMV sources. Other potential uses include underwater FMV bathymetric reconstruction and mobile video collection from ground vehicles.

Receiver 10 is a processing component for receiving FMV data from ether a file or data stream Parser 20 a processing component which performs an algorithm for parsing FMV data into image files and metadata files.

Extractor 30 is a processing component which extracts metadata values.

Focal length and angle processer 40 is a virtual processor which iteratively calculates the focal length (f) and photogrammetric yaw angle (ω) and pitch angle (4i) for each image file.

Data matrix object 50 is a processing component for storing position coordinates associated with an image file and calculating the distance between position coordinates for image file pairs.

Proximity Filtering processor 60 is a virtual processor for filtering image files by comparing the distance between pairs of image file position coordinates to the proximity threshold value.

Cluster count processor 70 is a processing component which compares user-defined cluster count threshold value to the total image file count to the cluster count threshold.

Verification processor 80 performs processes to verify inclusion of all relevant image files in a cluster by sampling image files external to the cluster, as determined by position coordinates (x, y) and calculated yaw angle (ω).

Indexing component 90 is a processing component which associates a cluster index value with each stored image file.

In various embodiments, System 200 rejects video frames with clouds obscuring the target FOV through a histogram analysis routine wherein the user sets a minimum color threshold that is compared to the RGB value of each image file.

In other embodiments, System 200 exports cluster-associated image files and automatically generates a novel script for use in photogrammetric reconstruction software, to automatically execute the photogrammetric reconstruction using command-line call. Geospatial products (2-D and 3-D) are automatically exported, including position coordinates of the sensor path, cluster-associated image files with metadata, and cluster center position coordinates. Upon completion, a notice is provided to the user with the location of the geospatial product files.

Figure 3:
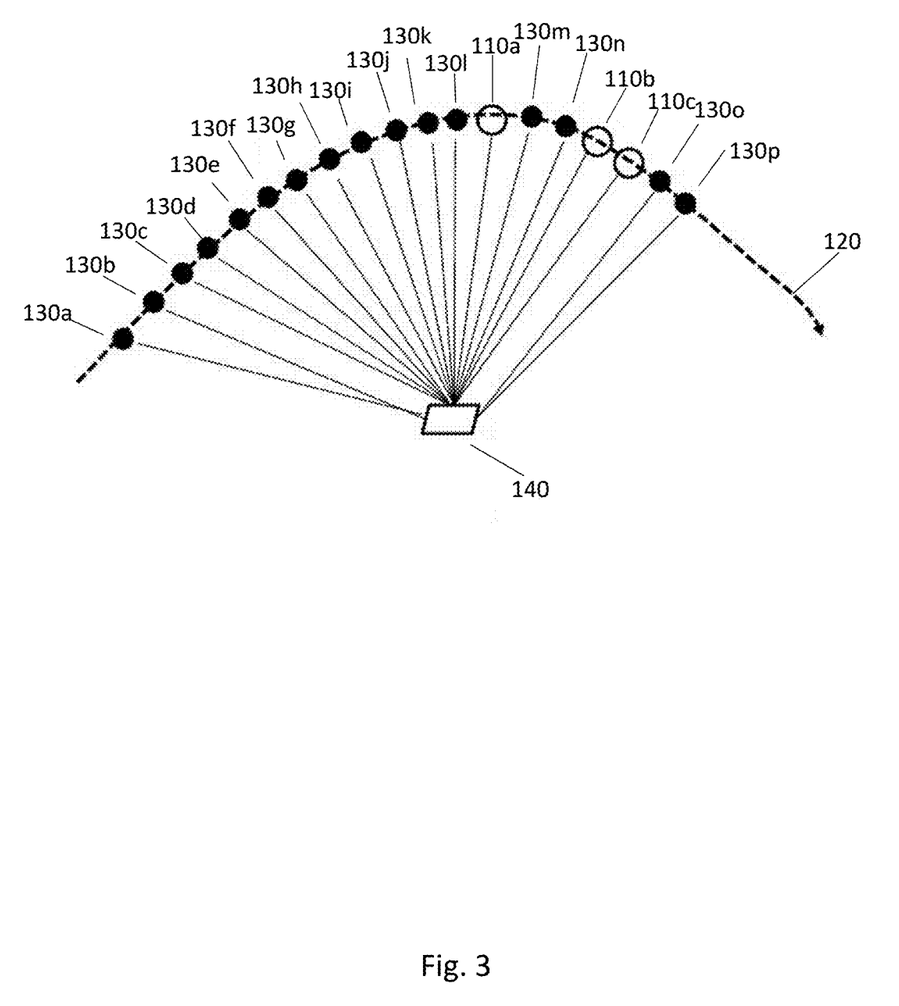
FIG. 3 illustrates an exemplary process of acquiring data which is subject to metadata loss, which is corrected through interpolation processes.

FIG. 3 illustrates an exemplary process of acquiring data which is subject to metadata loss. This metadata loss is corrected through interpolation processes.

In the exemplary embodiment shown, an FMV metadata file containing sensor positional data is missing metadata packets 110a-c. During Step 2b of Method 100, metadata values are extracted from FMV data. Often metadata is not updated regularly and packets are missing. In this case, an interpolation function uses available metadata packets to calculate metadata values for missing metadata packets.

Figure 4A:
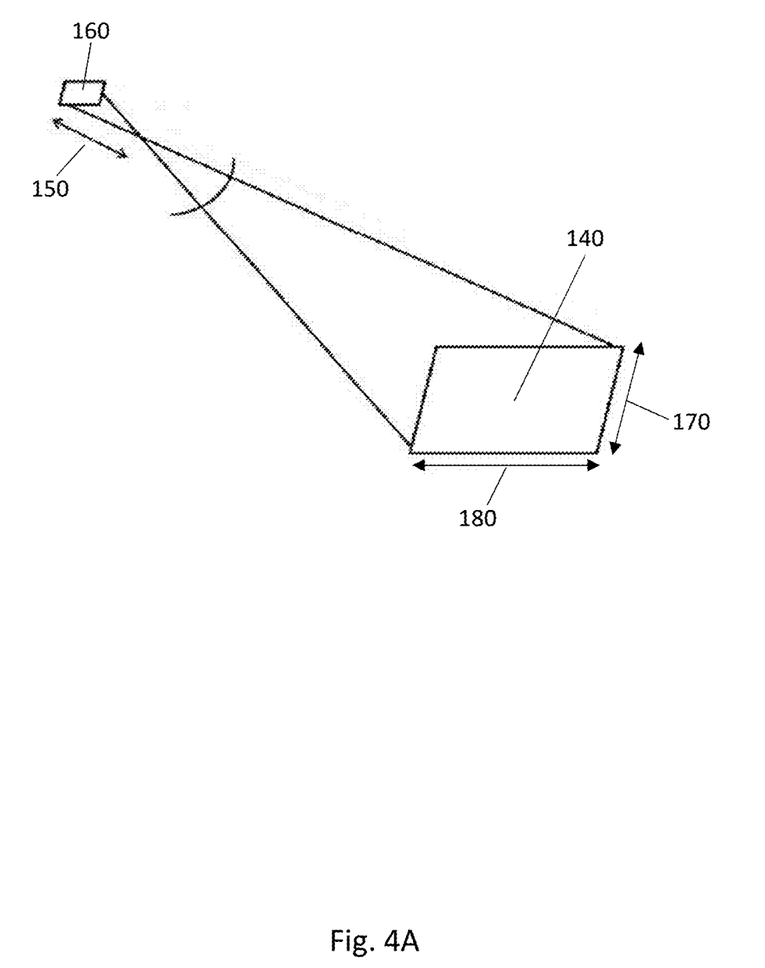
FIG. 4A illustrates an exemplary collection of a sensed data set which is extracted and used by the system to calculate the focal length parameter.

FIG. 3 illustrates sensor trajectory 120, field of view 140, available metadata packets 130a-p, and lines of missing metadata packets 110a-e, FIG. 4A illustrates an exemplary collection of a sensed data set which is extracted and used by System 200 to calculate the focal length parameter. The exemplary embodiment shown includes extracted data used for calculating focal length 150.

FIG. 4A further illustrates sensor 160, focal length 150, field of view 140, horizontal field of view dimension ($FOV_H$) 180, and vertical field of view dimension (FOV 170.

In Step 3a of Method 100, focal length 150 is calculated based on the horizontal field of view dimension (FOV$_H$) 180 and vertical field of view dimension (FOV$_V$) 170.

Figure 4B:
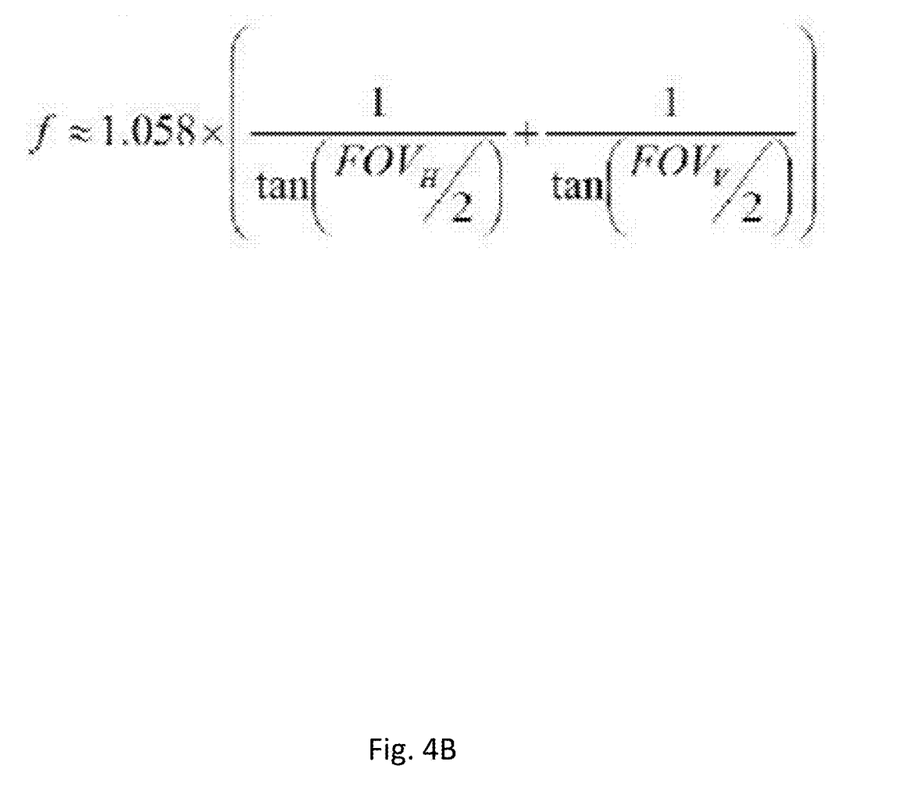
FIG. 4B illustrates an exemplary process for calculating the focal length for each image file which is used by the system for calculating FOV position coordinates.

FIG. 4B illustrates an exemplary process for calculating the focal length for each image file which is used by the system for calculating FOV position coordinates. The exemplary formula assumes that the sensor format is ⅓". The formula receives FOV horizontal and vertical dimension variables (FOV$_H$ and FOV$_V$) as input and produces a focal length value (f) as output.

$$f \approx 1.058 \cdot \left( \frac{1}{\tan\left(\frac{FOV_H}{2}\right)} + \frac{1}{\tan\left(\frac{FOV_V}{2}\right)} \right)$$

Figure 5A:
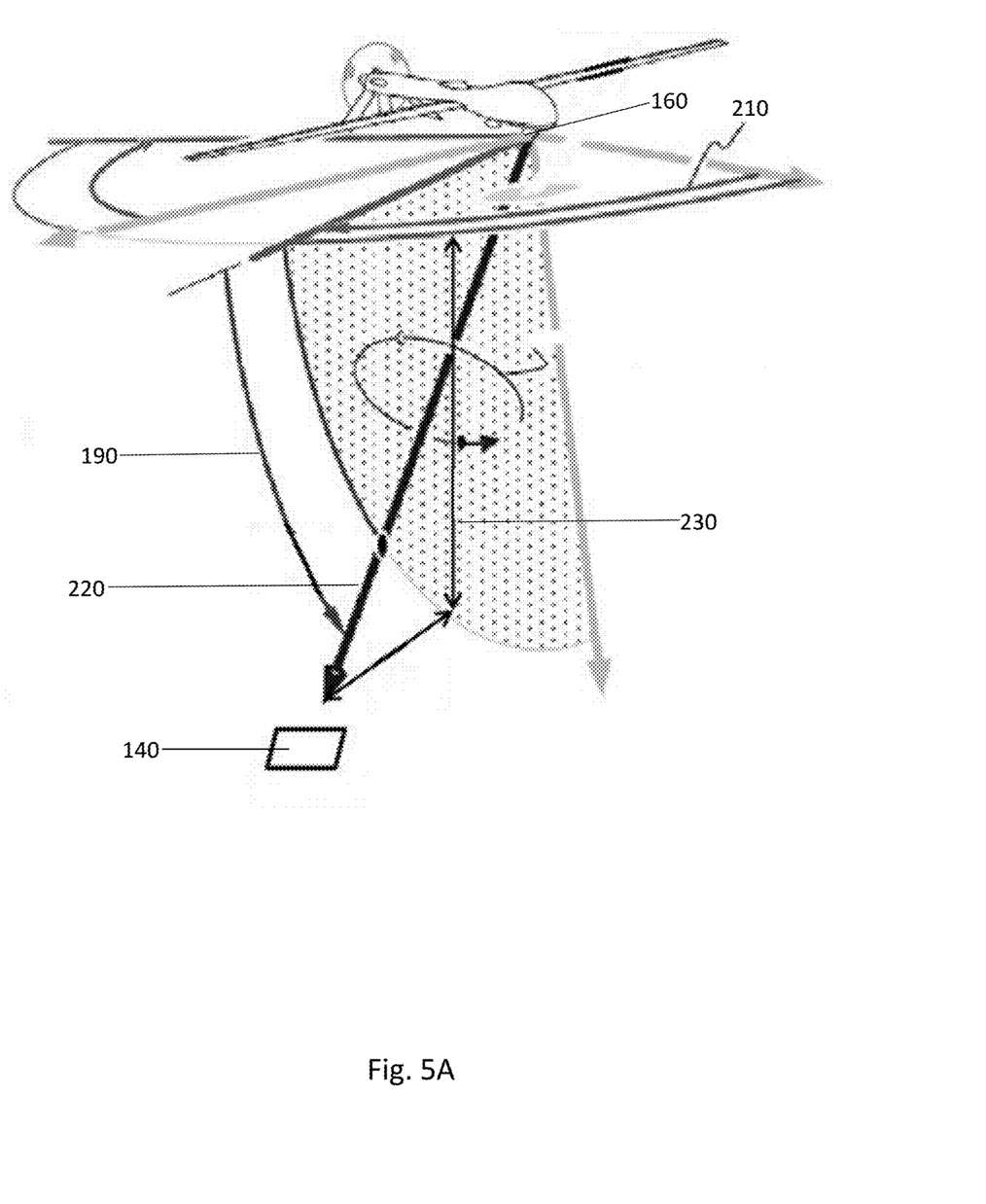
FIG. 5A illustrates an exemplary collection of a sensed data set used by the system to calculate photogrammetric relevant angles.

FIG. 5A illustrates an exemplary collection of a sensed data set used by the system to calculate photogrammetric relevant angles. Specifically, this data is used for calculating yaw angle (ω) 210 and pitch angle (φ) 190 for each image file. Each calculated yaw angle (ω) 210 and pitch angle (φ) 190 is associated with an image file and required for calculating POV position coordinates. Calculated yaw angle (ω) 210 is also used for verifying cluster identification.

FIG. 5A further illustrates the position of sensor 160, field of view 140, distance between sensor and field of view (Re) 220, altitude of sensor (h) 230, sensor-relative yaw angle (ω) 210 and pitch angle (φ) 190. In the embodiment shown, sensor 160 is mounted to an aircraft. In the embodiment shown, the FMV metadata information is used to calculate yaw angle (ω) 210 and pitch angle (φ) 190. In most embodiments, the roll angle is negligible.

Figure 5B:
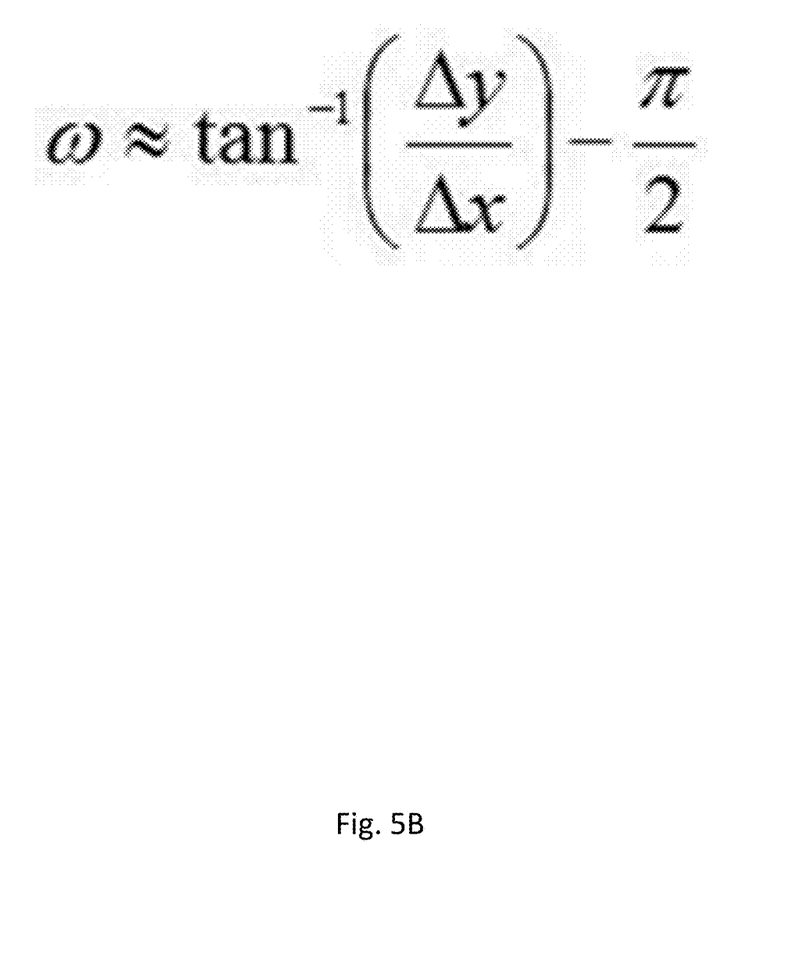
FIG. 5B illustrates an exemplary process for calculating the effective photogrammetric yaw (or heading) angle of the sensor relative to the FOV.

FIG. 5B illustrates an exemplary process for calculating the horizontal angle of orientation of the sensor relative to the FOV. This angle is referred to as the yaw angle (ω). Yaw angle (ω) 210 is separately calculated for each image file. Yaw angle (ω) 210 is used for calculating FOV position coordinates, and is further used for verifying cluster identification. In the exemplary embodiment shown, this calculation receives extracted metadata parameters including the change in altitude 230 of sensor 160 (Δy) and the change in lateral position of sensor 160 (Δx) as input and produces a yaw angle (ω) as output.

$$\omega \approx \tan^{-1}\left(\frac{\Delta y}{\Delta x}\right) - \frac{\pi}{2}$$

Figure 5C:
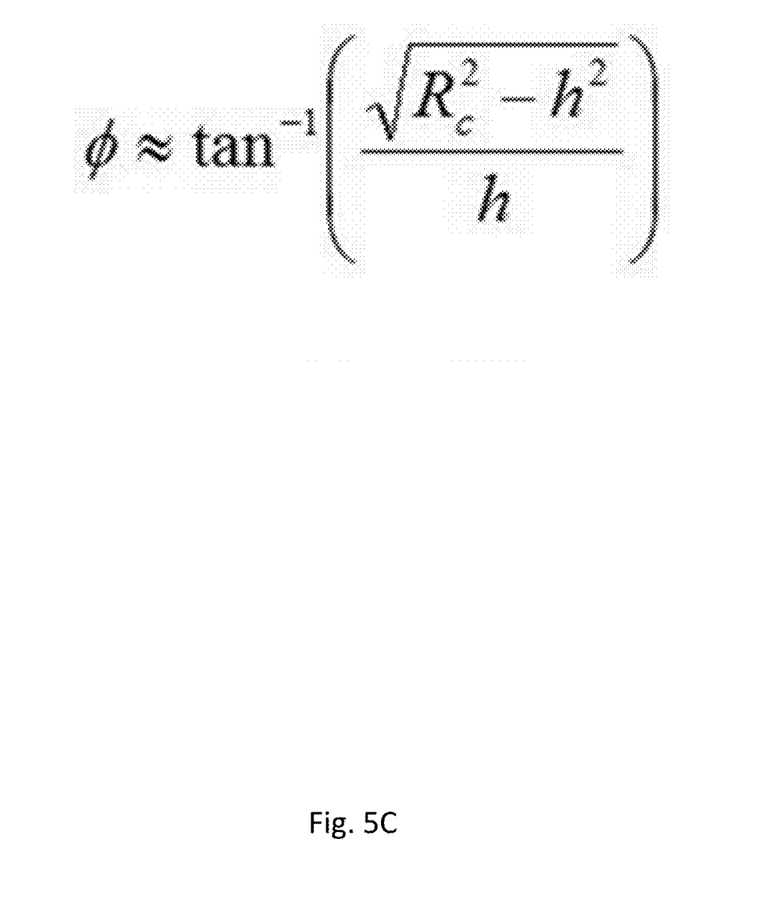
FIG. 5C illustrates an exemplary process for calculating the effective photogrammetric pitch angle of the sensor relative to the FOV.

FIG. 5C illustrates an exemplary process for calculating the vertical angle of orientation of the sensor relative to the FOV. This angle is referred to as the pitch angle (φ) 190 which is used for calculating FOV position coordinates. The exemplary formula shown receives the variables distance between sensor and field of view (R$_c$), and altitude of sensor (h) as input and produces a pitch angle (φ) value as output, $$\varphi \approx \tan^{-1}\left(\frac{\sqrt{R_c^2 - h^2}}{h}\right)$$

Figure 6A:
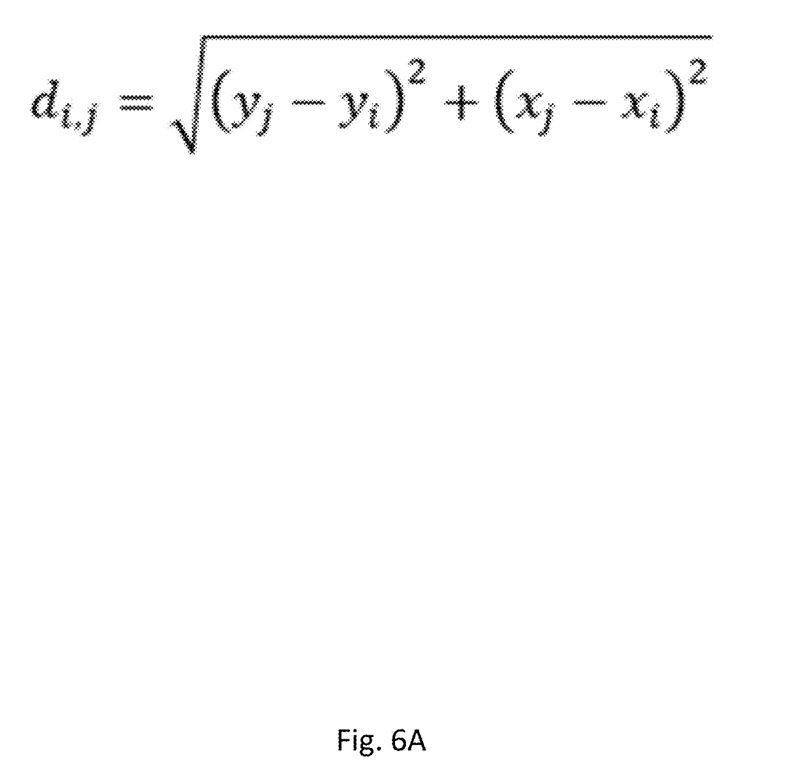
FIG. 6A illustrates an exemplary process for calculating the distance between FOV position coordinates.

FIG. 6A illustrates an exemplary process for calculating the distance between FOV position coordinates.

$$d_{i,j} = \sqrt{(y_j - y_i)^2 + (x_j - x_i)^2}$$

Figure 6B:
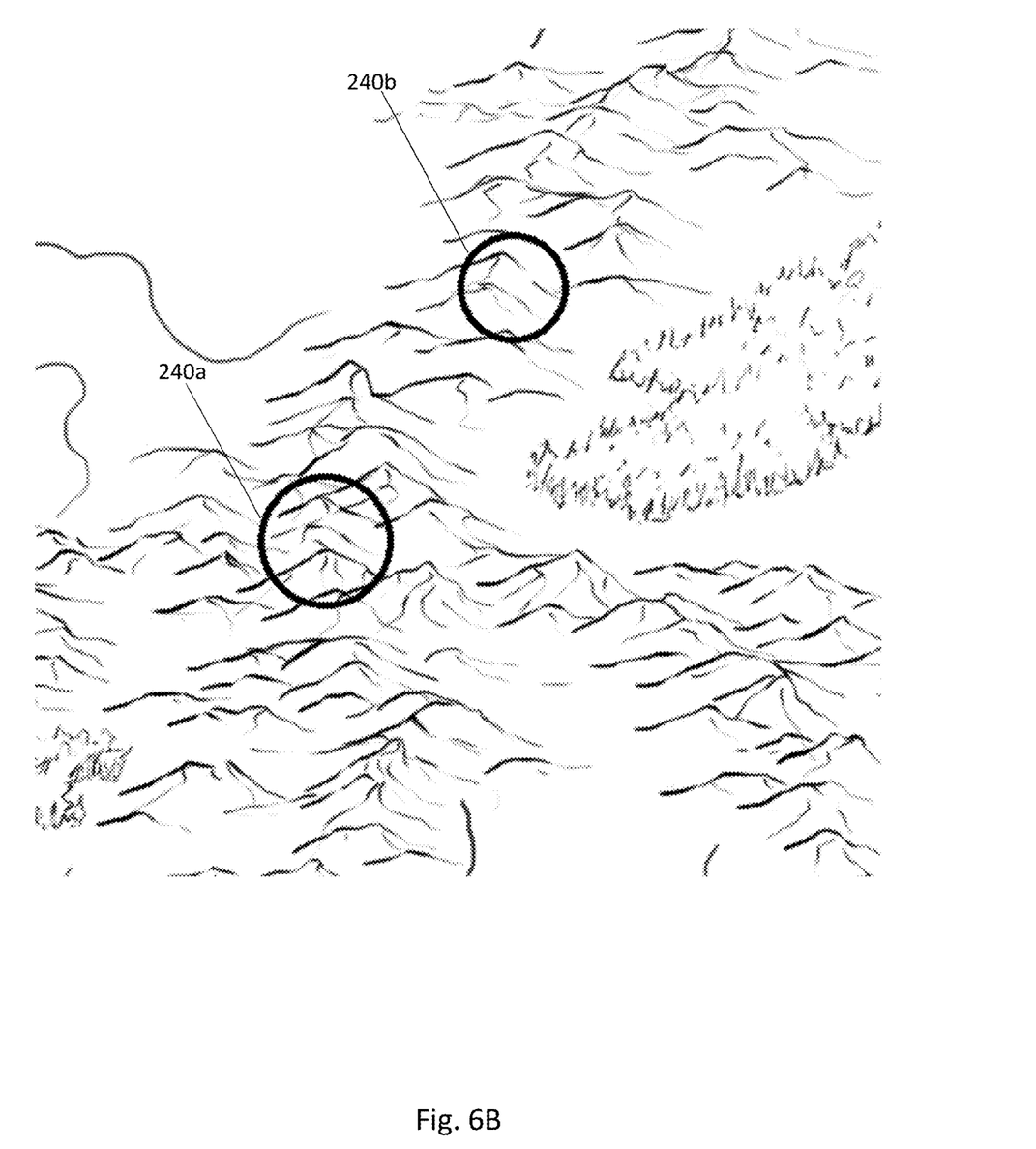
FIG. 6B illustrates an exemplary system output which is a 2-D cluster map depicting the location of clusters the system has identified.

FIG. 6B illustrates an exemplary system output which is a 2-D cluster map depicting the location of clusters System 200 has identified. The cluster map illustrates clusters 240a and 240b. The cluster map identifies FOV position coordinates of image files associated with each cluster. The clusters are associated with indexed individual image files.

In the exemplary embodiment shown, clusters are defined based on two system thresholds: the proximity threshold value and the cluster count threshold.

The proximity threshold value is the maximum allowed distance between image file coordinates. This is determined as a percentage of extracted metadata values which represent the horizontal field of view dimension (FOV$_H$), and vertical field of view dimension (FOV$_V$).

The cluster count threshold refers to a minimum number of image files which meet the proximity threshold for a cluster to be recognized.

An agglomerative clustering algorithm is used to decide which image files to use for each 3-D reconstruction. The clustering algorithm is based on calculated FOV position coordinates of image files.

Figure 7:
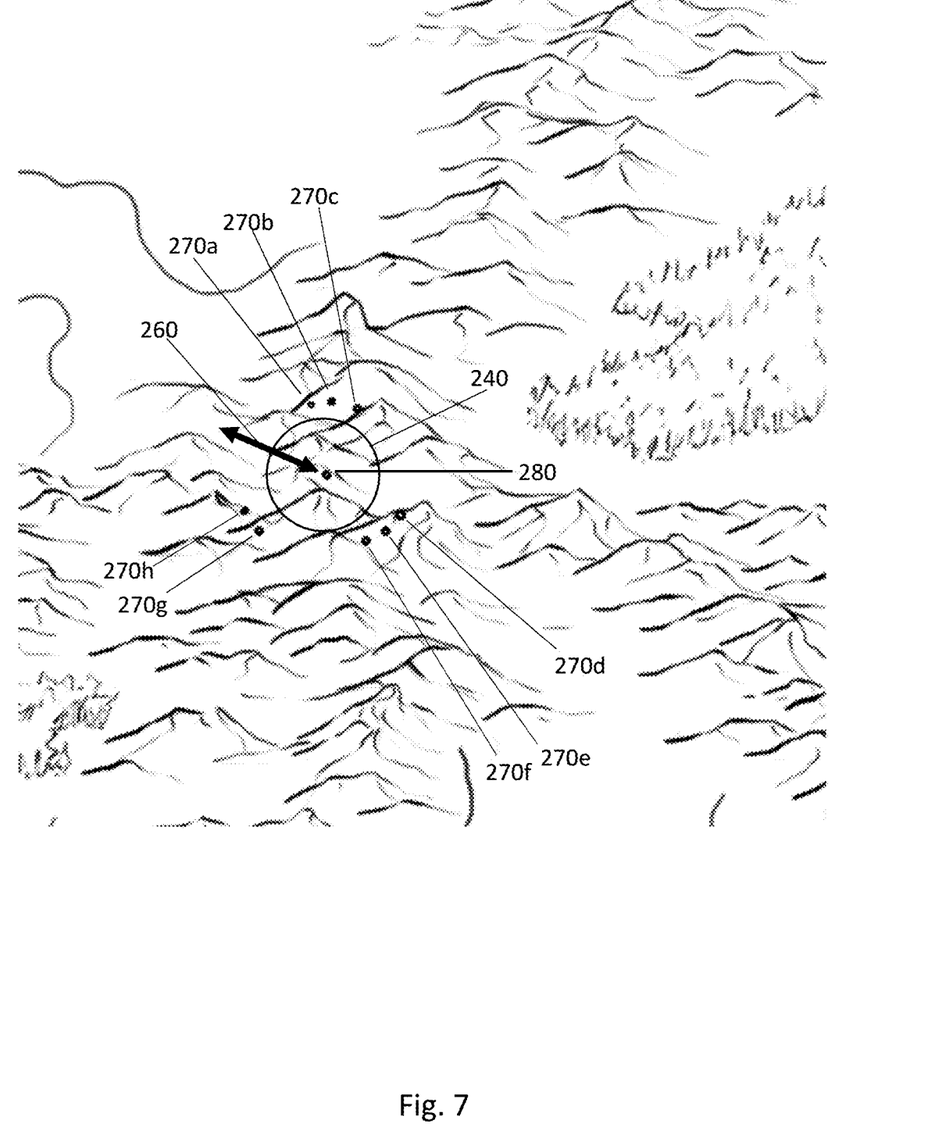
FIG. 7 illustrates an exemplary process of sampling image frames external to the cluster to verify that the set of image files associated with a cluster is correctly indexed.

FIG. 7 illustrates an exemplary process of sampling image frames external to the cluster to verify that the set of image files associated with a cluster is correctly indexed.

FIG. 7 further illustrates cluster 240, user-defined distance 260, FOV position coordinates of qualifying image files 270a-h, and cluster center 280, System 200 automatically samples image files having FOV position coordinates located within user-defined distance 260 of cluster center 280 in a pattern based on the calculated yaw angle 210.

What is claimed is:

1. A method to transform Full Motion Video (FMV) to photogrammetric data which is implemented on computer system having a memory and a processor and comprised of the steps of:
   receiving FMV data;
   parsing said FMV data to create image files and metadata files;
   extracting meta data values from said meta data files including sensor position coordinate values and field of view dimensions;
   calculating focal length values for each of said image files;
   calculating angles for each of said image files;
   calculating position value coordinates from said angles;
   calculating the distance (d) for image files pairs from said position value coordinates;
   creating filtered image files by comparing, distance (d) to a proximity value threshold; and
   comparing the number of filtered image files filtered to a cluster count threshold to identify clusters.

2. The method of claim 1 wherein said sensor position coordinate values and field of view dimensions include values selected from a group consisting of latitude, longitude, and altitude of the sensor and vertical FOV dimension FOVV and horizontal FOV dimension FOVH.

3. The method of claim 1, wherein said metadata files are Key-Length-Value (KLV) files.

4. The method of claim 1, which further includes the step of performing an interpolation algorithm.

5. The method of claim 4, wherein said interpolation algorithm is determined by computing averages of sensor position coordinates over time and populates said metadata values.

6. The method of claim 1 which further includes the step of calculating said proximity threshold by calculating a percentage of the FOV horizontal and vertical dimension variables (FOVH and FOVV).

7. The method of claim 1 wherein the step of calculating distance (d) further includes the step of iteratively populating a position value matrix data object having processing capability to calculate distance (d) and compare distance (d) to user defined thresholds.

8. The method of claim 7 which further includes the step of iteratively comparing distance (d) to said proximity threshold value.

9. The method of claim 1, which further includes the steps of incrementing a stored image file count.

10. The method of claim 1, which further includes the steps of comparing a stored mage file count to said cluster count threshold to determine if cluster exists.

11. The method of claim 1 which further includes associating image files with a value unique to a singleclusters.

12. The method of claim 1 wherein the step of calculating angles includes extracting values selected from a group consisting of one or more sensor altitude change values ($\Delta y$), one or more lateral position change values of said sensor ($\Delta x$), and one or more values representing distance between said sensor and said field of view (Rc), and one or more values representing altitude of said sensor (h).

13. The method of claim 1 wherein the step of calculating angles includes calculating one or more angles selected from a group consisting of yaw angle ($\omega$), pitch angle ($\varphi$).

14. The method of claim 1, wherein said FMV data is imported from a group of FMV sources consisting of a file and a live stream.

15. The method of claim 1, said live stream is selected from a group consisting of a continuous live stream, a discontinuous live stream and an intermittent live stream.

16. The method of claim 1, wherein said method further includes the step of filtering said image files having an RGB value below a user-defined color threshold value.

17. The method of claim 1, which further includes the step of creating a geographic data set corresponding to said FMV data.

18. The method of claim 1, which further includes the step creating a photogrammetric data file which may be processed by photogrammetric analysis software.

19. A computer system having memory and processing components including:
    a receiver component for receiving FMV data;
    a parsing component for receiving FMV data and parsing said FMV data input to produce image files and metadata files as output;
    an extraction component for receiving said metadata files as input extracting and storing said metadata values;
    a focal length processing component which receives FOV horizontal and vertical dimension variables ($FOV_H$ and $FOV_V$) as input and produces a focal length value (f) as output;
    an angle processing component which receives sensor values as input and produces yaw angle ($\omega$) value and pitch angle ($\varphi$) values as output;
    a data matrix object which includes at least one data structure for storing position coordinate values and a virtual processing component for calculating distance (d) between position coordinate values for image file pairs);
    a first virtual processor which iteratively receives values for distance (d) as input for each image frame and compares said distance (d) to a proximity value threshold to filters said image files for further processing;
    a cluster verification virtual processing component which iteratively compares image file position coordinates to cluster center coordinates, of center of said clusters and said yaw angle ($\omega$); and
    and an indexing component for associating a cluster index value with each image file to identify the cluster with which the image is associated.

20. The computer system of claim 19 which further includes a component for calculating sensor position values selected from a group consisting of variables selected from a group of variables consisting of one or more sensor altitude change values ($\Delta y$), one or more lateral position change values of said sensor ($\Delta x$), one or more values representing distance between said sensor said field of view ($R_c$) and one or more values representing altitude of said sensor (h).

* * * * *